United States Patent
Cai et al.

(10) Patent No.: US 11,261,308 B2
(45) Date of Patent: Mar. 1, 2022

(54) SELF-EXPANDING LIGNOFOAM COMPOSITIONS AND LIGNOFOAMS MADE THEREFROM

(71) Applicants: Zhiyong Cai, Madison, WI (US); Qiangu Yan, Madison, WI (US); Jinghao Li, Madison, WI (US)

(72) Inventors: Zhiyong Cai, Madison, WI (US); Qiangu Yan, Madison, WI (US); Jinghao Li, Madison, WI (US)

( * ) Notice: Subject to any disclaimer, the term of this patent is extended or adjusted under 35 U.S.C. 154(b) by 225 days.

(21) Appl. No.: 16/391,424

(22) Filed: Apr. 23, 2019

(65) Prior Publication Data

US 2020/0339776 A1    Oct. 29, 2020

(51) Int. Cl.
*C08L 97/00* (2006.01)
*C08J 9/06* (2006.01)
*C08J 9/02* (2006.01)

(52) U.S. Cl.
CPC . *C08J 9/06* (2013.01); *C08J 9/02* (2013.01); *C08L 97/005* (2013.01);
(Continued)

(58) Field of Classification Search
CPC ........ C08J 9/06; C08J 97/005; C08J 2397/00; C08J 2423/06; C08J 2423/12;
(Continued)

(56) References Cited

U.S. PATENT DOCUMENTS 6,168,857 B1    1/2001  Andersen
8,034,266 B2   10/2011  Spradling
(Continued)

FOREIGN PATENT DOCUMENTS

DE    102015223556 A1 *  6/2017  ............ B32B 27/06
JP    2009265437 A       11/2009
WO    WO-2018035598 A1 *  3/2018  ............... C08J 3/12

OTHER PUBLICATIONS

Lebo, S.E., Jr., Gargulak, J.D. and McNally, T.J. (2002). Lignin. In Encyclopedia of Polymer Science and Technology, (Ed.), https://doi.org/10.1002/0471440264.pst179 (Year: 2002).*
(Continued)

*Primary Examiner* — Michael M Dollinger
*Assistant Examiner* — Christina H. W. Rosebach

(57) ABSTRACT

Methods of making self-expended lignofoams are provided. In embodiments, such a method comprises exposing a self-expanding lignofoam composition comprising raw lignin and a thermoplastic polymer to an elevated temperature for a period of time to soften the composition, desorb water from the raw lignin or induce at least some hydroxyl groups of the raw lignin to undergo dehydration reactions to generate water or both, vaporize the water, and generate pores throughout the softened composition. The method further comprises cooling the porous, softened composition to room temperature to provide the self-expanded lignofoam. The self-expanding lignofoam composition is free of an added plasticizer, an added lubricant, an added foaming agent, and an added blowing agent, and the thermoplastic polymer is not a starch, not a polyurethane, and not a polysiloxane. The resulting self-expanded lignofoams are also provided.

18 Claims, 2 Drawing Sheets

(52) U.S. Cl.
CPC ........ *C08J 2201/03* (2013.01); *C08J 2203/10* (2013.01); *C08J 2397/00* (2013.01); *C08J 2423/06* (2013.01); *C08J 2423/12* (2013.01); *C08J 2433/12* (2013.01); *C08J 2433/20* (2013.01); *C08J 2469/00* (2013.01); *C08J 2471/02* (2013.01)

(58) Field of Classification Search
CPC ................ C08J 2433/20; C08J 2469/00; C08J 2471/02; C08J 2201/03; C08J 2203/10; C08J 2433/12; C08L 97/005
See application file for complete search history.

(56) References Cited

U.S. PATENT DOCUMENTS

| | | |
|---|---|---|
| 2016/0368186 A1 | 12/2016 | Stevens |
| 2018/0002451 A1 | 1/2018 | Changfeng |
| 2018/0079871 A1 | 3/2018 | Tudman |
| 2019/0248656 A1 | 8/2019 | Cai |
| 2020/0131318 A1* | 4/2020 | Ton-That .................. C08J 3/12 |

OTHER PUBLICATIONS

Translation of DE 102015223556 by Eversmann et al. (Year: 2015).*
Dias, Otavio Augusto Titton, et al. Abstract from "Development of high bio-content polypropylene composites with different industrial lignins." Polymers for Advanced Technologies 30.1 (2019): 70-78.
Mimini, Vebi, et al. Abstract from "Lignin-based foams as insulation materials: a review." Holzforschung 73.1 (2019): 117-130.

* cited by examiner

SELF-EXPANDING LIGNOFOAM COMPOSITIONS AND LIGNOFOAMS MADE THEREFROM

REFERENCE TO GOVERNMENT RIGHTS

This invention was made with government support under 18-RD-11111124-005 awarded by the USDA Forest Service. The government has certain rights in the invention.

BACKGROUND

The majority of foams are made using synthetic polymers and additives such as catalysts, foaming/blowing agents, surfactants, and/or crosslinking agents to produce a synthetic polymer foam. Some foams have been made using natural polymers such as lignin. However, such foams generally make use of pretreated lignin, relatively small amounts of lignin, and/or lignin which is covalently bound to other components (e.g., polymeric components) of the foam, e.g., as a monomeric component or a crosslinker. In addition, the processes for forming such lignin-containing foams have drawbacks as do the lignin-containing foams themselves.

SUMMARY

Provided are self-expanding lignofoam compositions and methods of making self-expanded lignofoams from the compositions. The self-expanded lignofoams are also provided.

In one aspect, a method of making a self-expanded lignofoam is provided. In embodiments, such a method comprises exposing a self-expanding lignofoam composition comprising raw lignin and a thermoplastic polymer to an elevated temperature for a period of time to soften the composition, desorb water from the raw lignin or induce at least some hydroxyl groups of the raw lignin to undergo dehydration reactions to generate water or both, vaporize the water, and generate pores throughout the softened composition. The method further comprises cooling the porous, softened composition to room temperature to provide the self-expanded lignofoam. The self-expanding lignofoam composition is free of an added plasticizer, an added lubricant, an added foaming agent, and an added blowing agent, and the thermoplastic polymer is not a starch, not a polyurethane, and not a polysiloxane. The resulting self-expended lignofoams are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
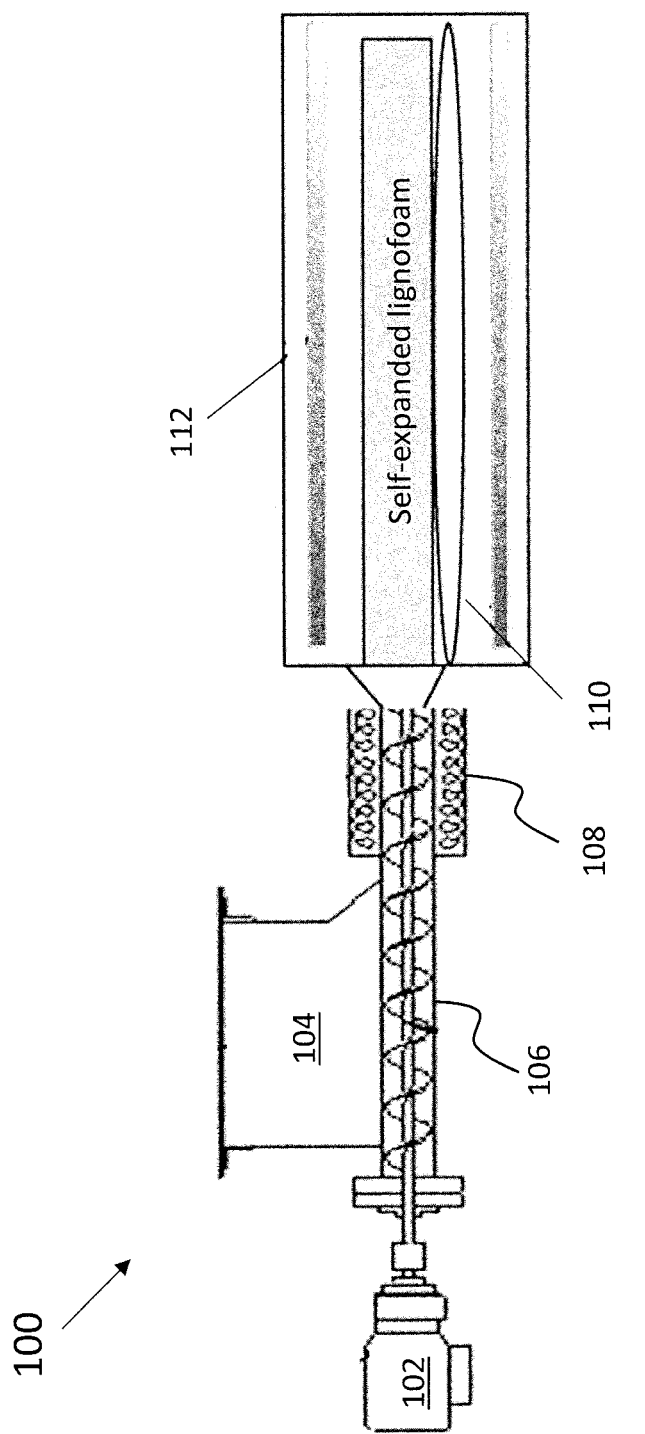
FIG. 1 is a schematic showing an extrusion system which may be used to carry out a method of a self-expanding lignofoam according to an illustrative embodiment.

Provided are self-expanding lignofoam compositions and methods of making self-expanded lignofoams from the compositions. The self-expanded lignofoams are also provided.

A method of making a self-expanded lignofoam may comprise exposing a self-expanding lignofoam composition comprising raw lignin and a thermoplastic polymer to an elevated temperature for a period of time to soften the composition. This step is also carried out to induce desorption of water (either physically adsorbed or chemically bound to the raw lignin) and/or to induce at least partial dehydration of hydroxyl groups of the raw lignin. Desorbed water and/or water released from dehydration reactions vaporizes, generating pores throughout the softened composition. The method further comprises cooling the porous, softened composition to provide the self-expanded lignofoam.

By "raw lignin," it is meant lignin which has not been previously subjected to a treatment to alter its chemistry or its purity, e.g., treatments such as those disclosed in U.S. Pat. Pub. Nos. 20090062516, 20180079871, 20180002451. However, "raw lignin" does encompass lignin which is derived from different biological sources and lignin which is extracted from those different biological sources using different extraction processes. Thus, "raw lignin" encompasses, e.g., Kraft lignin, sulfate lignin, lignosulfonates, milled wood lignin, organosolv lignin, alkali lignin, soda lignin, hydrolytic lignin, Klason lignin, black liquor, red liquor, or brown liquor. Raw lignin may be purchased from commercial sources, e.g., Sigma-Aldrich, Inc. Raw lignin such as organosolv lignin, lignosulfonates, alkali lignin, hydrolytic lignin, and Klason lignin may be purchased from Sigma-Aldrich, Inc. Other raw lignin, e.g., Kraft lignin, may be obtained from manufacturers such as Domtar.

The self-expanding lignofoam compositions may also comprise an amount of at least partially decomposed lignin. By "at least partially decomposed lignin," it is meant raw lignin (see above) which has been subjected to a heat treatment to at least partially decompose the lignin. The decomposition reactions are distinguished from the water desorption/dehydration reactions described above and generally require higher temperatures. In the decomposition reactions, covalent bonds between various lignin monomeric units may be broken so that the lignin is at least partially depolymerized. In the desorption/dehydration reactions, the monomeric units generally remain intact. This heat treatment may involve exposure to a temperature of from 200° C. to 550° C. for a time of from 10 min to 60 min. However, consistent with the definition of "raw lignin" above, the "at least partially decomposed lignin" has not been subjected to any other treatment to otherwise alter its chemistry and purity.

The lignin of the self-expanding lignofoam compositions, whether raw or at least partially decomposed, may be characterized by its moisture content. Moisture content may be determined using the ASTM D4442-07 standard. The moisture content of the lignin may be in a range of from 0 weight (wt) % to 30 wt % (as compared to the total weight of the water and lignin). This includes moisture contents in a range of from 2 wt % to 30 wt % or from 5 wt % to 15 wt %. It has been found that a moisture content in the range of from 5 wt % to 15 wt % is particularly desirable.

A variety of thermoplastic polymers may be used in the self-expanding lignofoam compositions. Illustrative thermoplastic polymers include polypropene (PP), poly(methyl methacrylate) (PMMA), acrylonitrile butadiene styrene (ABS), nylon, polybenzimidazole (PBI), polycarbonate (PC), polyether sulfone (PES), polyoxymethylene (POM), polyether ether ketone (PEEK), polyethylene terephthalate (PETE), polyetherimide (PEI), polyethylene (PE), polyphenylene oxide (PPO), polyphenylene sulfide (PPS), polystyrene (PS), polyvinyl chloride (PVC), teflon or polytetrafluoroethylene (PTFE), polyacrylonitrile (PAN), and combinations thereof. The thermoplastic polymers may be those which originate from waste or recycled material. However, certain thermoplastic polymers are generally not used. These include starch and starch-based polymers. Other polymers which are generally not used are polyurethanes and polysiloxanes (silicones). Thus, the self-expanding lignofoam compositions may be free of starch, starch-based polymers, polyurethanes, and polysiloxanes.

Some additives may be used in the self-expanding lignofoam compositions. Illustrative additives include inorganic oxides such as silica gel and alumina. However, other additives are generally not included in the self-expanding lignofoam compositions. These additives include the following: compounds capable of reacting with lignin to covalently bind the lignin to another component of the composition (e.g., isocyanates, silanes); compounds capable of inducing such reactions (e.g., catalysts); foaming/blowing agents (surfactants, separately added gases, baking powder, axodicarbonamide, titanium hydride, isocyanates, wood flour, wood fiber); and processing aids such as plasticizers (e.g., glycol, glycerol, crude glycerol, epoxidized soybean oil, poly(ethylene glycol), poly(propylene glycol) and others disclosed in International Pat Pub. No. WO2018035598) and lubricants (e.g., stearic acid, sodium stearate, calcium stearate, mineral oil and others disclosed in International Pat Pub. No. WO2018035598). The self-expanding lignofoam compositions may be free of each of these additives, i.e., they are not added to the composition before or during the methods disclosed herein. It is unexpected that self-expanded lignofoams having the properties described below (e.g., Table 1) above are able to be formed without such lignin-reactive additives, foaming/blowing agents, and processing aids, particularly at such high lignin contents.

Various amounts of the various components described above may be included in the self-expanding lignofoam compositions, e.g., to tune the properties of the self-expanded lignofoam formed from the compositions. In embodiments, the lignin content (whether raw lignin or including at least partially decomposed lignin) is at least 25 wt %, at least 30 wt %, at least 35 wt %, at least 40 wt %, at least 45 wt %, at least 50 wt %, at least 55 wt %, or in a range of from 25 wt % to 95 wt %, or from 50 wt % to 95 wt %. In embodiments, the thermoplastic polymer content is no more than 45 wt %, no more than 40 wt %, no more than 35 wt %, no more than 30 wt %, no more than 25 wt %, no more than 20 wt %, no more than 15 wt %, or in a range of from 5 wt % to 50 wt %. An additive, when included, may be present in an amount of from 1 wt % to 15 wt %. Regarding the lignin contents described above, the lignin content may be exclusively raw lignin. However, in embodiments, the lignin content may be from 3 wt % to 20 wt % of at least partially decomposed lignin, with the balance as raw lignin.

In embodiments, the self-expanding lignofoam composition consists essentially of, or consists of, raw lignin, thermoplastic polymer, optionally, at least partially decomposed lignin, and optionally, an inorganic oxide.

The self-expanding lignofoam compositions may be made by mixing a desired amount of the desired components for a period of time, e.g., from 5 to 60 minutes. The mixing may be conducted in a blender or ball mill or the like. The resulting self-expanding lignofoam composition is in the form of a solid powder (however, the moisture content of the powder may be within the ranges described above).

As noted above, die self-expanding lignofoam composition is exposed to an elevated temperature for a period of time to soften the composition, vaporize water (from desorption or at least partial dehydration of hydroxyl groups of the raw lignin), and generate pores throughout the softened composition. Although the specific elevated temperature depends upon die selection of lignin type and thermoplastic polymer, the elevated temperature is generally one which is greater than die glass-transition temperature $(T_g)$ but less than the decomposition temperature $(T_d)$ of the lignin. The elevated temperature may be the same as, or greater than, the softening temperature $(T_s)$ of the lignin and the same as, or greater than, the melting temperature $(T_m)$ of the thermoplastic polymer. The elevated temperature may be in a range of from 150° C. to 300° C., from 180° C. to 300° C., from 200° C. to 300° C., from 250° C. to 300° C., or from 200° C. to 250° C. The period of time may also vary, e.g., from 5 min to 120 min, from 10 min to 60 min, from 30 min to 60 min, or from 5 min to 10 min. At these temperatures, physically adsorbed/chemically bonded water desorbs from the raw lignin and/or at least some hydroxyl groups of the raw lignin undergo dehydration reactions. The resulting water vaporizes and to produce the pores. The method further comprises cooling (e.g., to room temperature, i.e., 20° C. to 25° C.) the porous, softened composition to provide the self-expanded lignofoam. Each of the steps of the method may be carried out under ambient atmosphere, e.g., as opposed to an inert atmosphere. The exact selection of elevated temperature, period of time, and cooling rate (time to reach room temperature) may also be selected to tune the properties of the self-expanded lignofoam. Heating may be accomplished using various techniques, e.g., an oven, a furnace. Microwave heating or heating using higher radiation frequencies may be used.

The steps of the method may be carried out using an extrusion system, e.g., the extrusion system 100 of FIG. 1. The extrusion system 100 includes a motor 102, a volumetric feeder 104, an auger feeder 106, a heater/heating chamber 108, a conveyor belt 110, and a cooling chamber 112. Any of the self-expanding lignofoam compositions described above may be loaded into the volumetric feeder 104. The auger feeder 106 feeds the composition to the heating chamber 108, exposing the composition to the desired elevated temperature for the desired time. The subsequent extrusion releases the softened porous composition which cools in the cooling chamber 112 to provide the self-expanded lignofoam.

Figure 2:
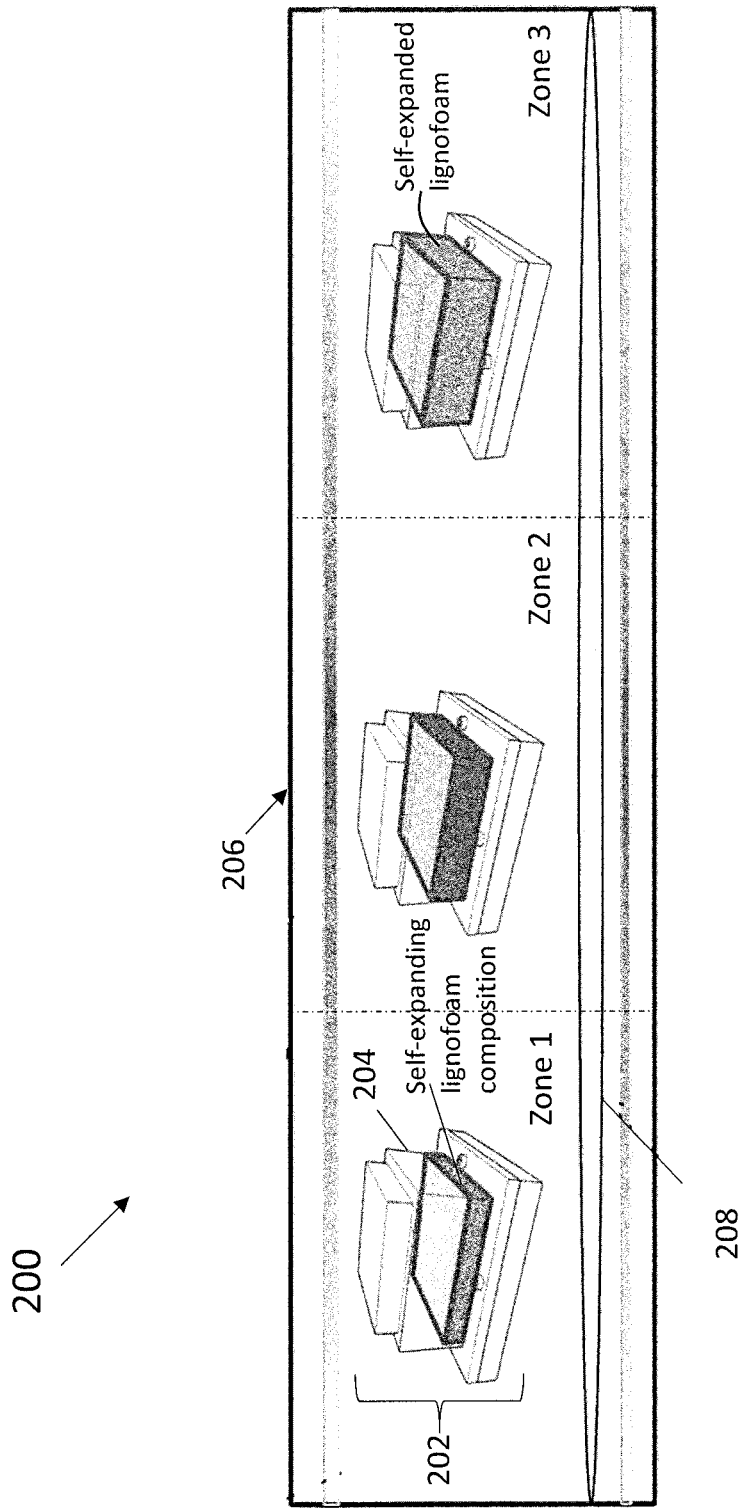
FIG. 2 is a schematic showing a compression molding system which may be used to carry out a method of making a self-expanding lignofoam according to an illustrative embodiment.

The steps of the method may also be carried out using a compression molding system, e.g., the compression molding system 200 of FIG. 2. This system 200 includes a molding assembly 202 which includes a molding chamber 204 configured to contain any of the self-expanding lignofoam compositions described above. The molding assembly 202 may be placed in a chamber 206 including a conveyor belt 208 for moving the molding assembly 202 between different zones in the chamber 206. Loading of the self-expanding lignofoam composition may place in zone 1. Heating may also begin in zone 1 and continue to zone 2 which may be held at the desired temperature. The molding assembly 202 may remain in zone 2 for the desired period of time, renting begins by moving the molding assembly 202 from zone 2 to zone 3. In the system of 200, pressure may be applied to the self-expanding lignofoam composition at various stages. For example, prior to any heating, a plate (not shown) may be placed on the self-expanding lignofoam composition and a pressure applied of greater than 0 to 10 MPa. A plate (not shown) may be placed on the self-expanding lignofoam composition while heating in zone 1, 2, or both, and a pressure applied of from 10 to 10,000 Pa. The pressure may be continued to be applied in zone 3. These applications of pressure may be useful to control the properties of the resulting the self-expanded lignofoam.

Also provided are the self-expanded lignofoams formed using the self-expanding lignofoam compositions and methods described above. Because the methods described above involve raw lignin and relatively low temperatures, the elemental composition of the lignin portion of the self-expanded lignofoams is similar to that of the lignin portion of die self-expanding lignofoam composition itself. Thus, in embodiments, the C, H, O, N, elemental composition of the lignin portion of the self-expanded lignofoam is within ±0.5% of the lignin portion of the self-expanding lignofoam composition. This is by contrast to methods which make use of Higher temperatures which induce significant lignin decomposition. This also distinguishes the self-expanded lignofoams from carbon/graphene foams.

Since the self-expanding lignofoam compositions may exclude certain additives as described above, these additives may also be excluded from the resulting self-expanded lignofoams. In addition, die absence of certain of these additives means that the self-expanded lignofoam may be characterized as being free of urethane bonds, free of crosslinking, and/or free of covalent bonds between lignin and other components of the self-expanded lignofoam. The self-expanded lignofoam may be characterized as a three-dimensional porous matrix comprising entangled chains of lignin and the thermoplastic polymer.

The self-expanded lignofoams may be further characterized by one or more properties such as ash content (e.g., 0.3 to 1.5%), apparent density (e.g., 0.20 to 0.50 g/cm$^3$), porosity (e.g., 30% to 80%), compressive strength (e.g., 3 to 20 MPa), and room temperature thermal conductivity (e.g., 0.03 to 0.1 W/m/K). Each of these properties may be determined using the standard techniques described in the Example, below.

Finally, it is noted that although other processing may be conducted on the disclosed self-expanded lignofoams, in embodiments, the processing does not include converting (via carbonization or graphitization) the self-expanded lignofoam to a carbon foam. As noted above, the self-expanded lignofoams are distinguished from carbon/graphene foams.

Example

In the Examples below, self-expanding lignofoam compositions consisting of raw lignin and various thermoplastic polymers were formed. Self-expanded lignofoams were then formed wing either extrusion using the system of FIG. 1 or compression molding using the system of FIG. 2. The conditions used in each case are described below.

The morphology and microstructure of the resulting self-expanded lignofoam samples were investigated using scanning electron microscopy (SEM). The samples were coated with gold-palladium alloy of 10-15 nm thickness using a sputter coater prior to SEM examination. Both the apparent ($D_a$) and true densities ($D_t$) of the self-expanded lignofoam samples were measured following standard methods ASTM D 1622 and ASTM D 792-08. The bulk porosity of the self-expanded lignofoam samples was calculated using the following equation: P (%)=100×(($D_t$−$D_a$)/($D_t$)), where P is bulk porosity; $D_t$ is true density and $D_a$ is apparent density.

Additional experiments were conducted according to ASTM standards to determine the properties of the self-expanded lignofoam samples. The compression strength was tested according to ASTM Standard C365/C365M-05. The tests were carried out at room temperature on an electron universal testing machine. Thermal conductivity was measured following ASTM Standard E1225 by a laser flash thermal analyzer at room temperature. The fire resistance of the self-expanded lignofoam samples was tested following the standard method of ASTM E 1354.

Example 1

In this Example, 240 grams of Kraft lignin (raw lignin) and 60 grams of polyethylene) powder were put into a blender and mixed very well for 30 minutes. The composition was then transferred into the molding chamber of the molding system of FIG. 2. Experiments were conducted as follows. The composition was cold-pressed under a pressure of between 0 (no pressure) and 10 MPa. The (pressed) composition was transferred in the molding chamber to the heating chamber and a metal plate was placed on the top of the pressed composition, the metal plate applying pressure from 10 to 10,000 Pa. The heating chamber was then heated at a rate of from 5-20° C./min up to a temperature of from 200-260° C. and held for 30 to 60 minutes. Next, the molding chamber was cooled down to room temperature. These experiments resulted in an open-celled, self-expanded lignofoam which was subsequently removed from the mold. Results from a representative self-expanded lignofoam sample are shown in Table 1, below.

Example 2

In this Example, 270 grams of Kraft lignin (raw lignin) and 30 grams of polypropylene) were put into a blender and mixed very well for 30 minutes. The composition was then transferred into the molding chamber of the molding system of FIG. 2. Experiments were conducted as follows. The composition was cold-pressed under a pressure of between 0 (no pressure) and 10 MPa. The (pressed) composition was transferred in the molding chamber to the heating chamber and a metal plate was placed on the top of the pressed composition, the metal plate applying pressure from 10 to 10,000 Pa. The heating chamber was then heated at a rate of from 5-20° C./min up to a temperature of from 220-260° C. and held for 30 to 60 minutes. Next, the molding chamber was cooled down to room temperature. These experiments resulted in an open-celled, self-expanded lignofoam which was subsequently removed from the mold. Results from a representative self-expanded lignofoam sample are shown in Table 1, below.

Example 3

In this Example, 250 grams of Kraft lignin (raw lignin) and 50 grams of poly(methyl methacrylate) were put into a blender and mixed very well for 30 minutes. The composition was then transferred into the molding chamber of the molding system of FIG. 2. Experiments were conducted as follows. The composition was cold-pressed under a pressure of between 0 (no pressure) and 10 MPa. The (pressed) composition was transferred in the molding chamber to the heating chamber and a metal plate was placed on the top of the pressed composition, the metal plate applying pressure from 10 to 10,000 Pa. The heating chamber was then heated at a rate of from 5-20° C./min up to a temperature of from 200-250° C. and held for 30 to 60 minutes. Next, the molding chamber was cooled down to room temperature. These experiments resulted in an open-celled, self-expanded lignofoam which was subsequently removed from the mold. Results from a representative self-expanded lignofoam sample are shown in Table 1, below.

Example 4

In this Example, 180 grams of Kraft lignin (raw lignin) and 120 grams of poly(methylene oxide) powder were put into a blender and mixed very well for 30 minutes. The composition was then transferred into the molding chamber of the molding system of FIG. 2. Experiments were conducted as follows. The composition was cold-pressed under a pressure of between 0 (no pressure) and 10 MPa. The (pressed) composition was transferred in the molding chamber to the heating chamber and a metal plate was placed on the top of the pressed composition, the metal plate applying pressure from 10 to 10,000 Pa. The heating chamber was then heated at a rate of from 5-20° C./min up to a temperature of from 220-280° C. and held for 30 to 60 minutes. Next, the molding chamber was cooled down to room temperature. These experiments resulted in an open-celled, self-expanded lignofoam which was subsequently removed from the mold. Results from a representative self-expanded lignofoam sample are shown in Table 1, below.

Example 5

In this Example, 2500 grams of Kraft lignin (raw lignin) and 500 grams of polycarbonate powder were put into a blender and mixed very well for 30 minutes. The composition was then transferred to the auger feeder of the extrusion system of FIG. 1. The composition moves to the heating chamber of the extruder which had been heated at a rate of from 5-20° C./min up to a temperature of 180-250° C. The composition vends 5-10 minutes at this temperature before being extruded. Next, the extruded composition enters the cooling chamber to provide the self-expanded lignofoam sample. Results from a representative self-expanded lignofoam sample are shown in Table 1, below.

Example 6

In this Example, 2700 grams of Kraft lignin (raw lignin) and 300 grams of polyacrylonitrile powder were put into a Mender and mixed very well for 30 minutes. The composition was then transferred to the auger feeder of the extrusion system of FIG. 1. The composition moves to the chamber of the extruder which had been heated at a rate of from 5-20° C./min up to a temperature of 180-250° C. The composition vends 5-10 minutes at thin temperature before being extruded. Next, the extruded composition enters the cooling chamber to provide the self-expanded lignofoam sample. Results from a representative self-expanded lignofoam sample are shown in Table 1, below.

Example 7

In this Example, 3000 grams of Kraft lignin (raw lignin) were put into a blender and mixed very well for 30 minute. The composition was then transferred to the auger feeder of the extrusion system of FIG. 1. The composition moves to the heating chamber of the extruder which had been heated at a rate of from 5-20° C./min up to a temperature of 180-250° C. The composition vends 5-10 minutes at this temperature before being extruded. Next, the extruded composition enters the cooling chamber to provide the self-expanded lignofoam sample. Results from a representative self-expanded lignofoam sample are shown in Table 1, below.

Table 1 lists the properties (e.g., elemental composition, density, porosity, compressive strength, thermal conductivity) of representative self-expanded lignofoams formed in Examples 1-7.

Regarding elemental composition, the elemental composition refers to that of the lignin portion of the self-expanded lignofoams. The measured elemental composition of the self-expanded lignofoams is within ±0.5% of that of the lignin portion of the self-expanding lignofoam composition.

TABLE 1

Properties of illustrative self-expanded lignofoams.

| Property | Units | Example 1 | Example 2 | Example 3 | Example 4 | Example 5 | Example 6 | Example 7 |
|---|---|---|---|---|---|---|---|---|
| Elemental composition (C, H, O, N) | % | C: 65.5 ± 1.2<br>H: 8.1 ± 0.5<br>O: 26.6 ± 1.1<br>N: 0.03 ± 0.01 | C: 65 ± 1.0<br>H: 7.9 ± 0.5<br>O: 26.9 ± 1.2<br>N: 0.02 ± 0.01 | C: 64.7 ± 1.2<br>H: 7.7 ± 0.7<br>O: 27.2 ± 1.1<br>N: 0.03 ± 0.01 | C: 65.2 ± 1.2<br>H: 7.6 ± 0.5<br>O: 27.9 ± 1.0<br>N: 0.03 ± 0.01 | C: 65 ± 1.2<br>H: 7.8 ± 0.7<br>O: 27 ± 1.1<br>N: 0.02 ± 0.01 | C: 65.2 ± 1.0<br>H: 7.5 ± 0.5<br>O: 26.8 ± 1.3<br>N: 1.5 ± 0.3 | C: 64.5 ± 1.5<br>H: 7.2 ± 0.5<br>O: 28.3 ± 1.1<br>N: 0.03 ± 0.01 |
| Ash content | % | 0.6 ± 0.2 | 0.7 ± 0.2 | 0.6 ± 0.2 | 0.6 ± 0.2 | 0.7 ± 0.3 | 0.6 ± 0.2 | 0.8 ± 0.3 |
| Nominal (Bulk) Density | g/cc | 0.33 ± 0.05 | 0.31 ± 0.03 | 0.30 ± 0.03 | 0.4 ± 0.04 | 0.37 ± 0.03 | 0.35 ± 0.05 | 0.28 ± 0.06 |
| Porosity (Pore Volume) | % | 68 ± 3.7 | 70 ± 2.3 | 70.3 ± 3.0 | 62 ± 4.5 | 71 ± 2.7 | 70 ± 1.8 | 75 ± 5.1 |
| Compressive Strength | MPa | 10.8 ± 1.2 | 7.5 ± 1.0 | 12.1 ± 0.9 | 17.6 ± 1.8 | 11.0 ± 1.5 | 15.0 ± 1.7 | 3.0 ± 1.5 |
| Thermal Conductivity at room temperature | W/m-K | 0.06 ± 0.02 | 0.05 ± 0.03 | 0.06 ± 0.03 | 0.08 ± 0.01 | 0.05 ± 0.02 | 0.09 ± 0.01 | 0.05 ± 0.02 | tion was then transferred to the auger feeder of the extrusion system of FIG. 1. The composition moves to the heating chamber of the extruder which had been heated at a rate of from 5-20° C./min up to a temperature of 180-250° C. The composition vends 5-10 minutes at this temperature before being extruded. Next, the extruded composition enters the cooling chamber to provide the self-expanded lignofoam sample. Results from a representative self-expanded lignofoam sample are shown in Table 1, below.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description, it is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize die disclosure in various embodiments and with various modifications as suited to the particular use contemplated. It is intended that the scope of the disclosure be defined by the claims appended hereto and their equivalents.

What is claimed is:

1. A method of making a self-expanded lignofoam, the method comprising:
exposing a self-expanding lignofoam composition comprising raw lignin and a thermoplastic polymer to an elevated temperature for a period of time to soften the composition, desorb water from the raw lignin or induce at least some hydroxyl groups of the raw lignin to undergo dehydration reactions to generate water or both, vaporize the water, and generate pores throughout the softened composition,
wherein the self-expanding lignofoam composition is free of an added plasticizer, an added lubricant, an added foaming agent, and an added blowing agent, and the thermoplastic polymer is not a starch, not a polyurethane, and not a polysiloxane, and wherein the self-expanding lignofoam composition further comprises at least partially decomposed lignin; and
cooling the porous, softened composition to room temperature to provide the self-expanded lignofoam.

2. The method of claim 1, wherein the self-expanding lignofoam composition has a lignin content of at least 50 wt %.

3. The method of claim 1, wherein the at least partially decomposed lignin is present at an amount of from 3 wt % to 20 wt %.

4. The method of claim 3, wherein the self-expanding lignofoam composition has a lignin content of at least 50 wt %.

5. The method of claim 1, wherein the self-expanding lignofoam composition consists essentially of the raw lignin, the thermoplastic polymer, the at least partially decomposed lignin, and optionally, an inorganic oxide.

6. The method of claim 1, wherein the elevated temperature is from 150° C. to 300° C. and the period of time is from 5 min to 120 min.

7. The method of claim 6, wherein the elevated temperature is from 180° C. to 280° C. and the period of time is from 5 min to 60 min.

8. The method of claim 1, wherein the exposing and cooling steps of the method take place in an extrusion system.

9. A method of making a self-expanded lignofoam, the method comprising:
exposing a self-expanding lignofoam composition comprising raw lignin and a thermoplastic polymer to an elevated temperature for a period of time to soften the composition, desorb water from the raw lignin or induce at least some hydroxyl groups of the raw lignin to undergo dehydration reactions to generate water or both, vaporize the water, and generate pores throughout the softened composition,
wherein the self-expanding lignofoam composition is free of an added plasticizer, an added lubricant, an added foaming agent, and an added blowing agent, and the thermoplastic polymer is not a starch, not a polyurethane, and not a polysiloxane; and
cooling the porous, softened composition to room temperature to provide the self-expanded lignofoam, wherein the exposing and cooling steps of the method take place in a compression molding system.

10. The method of claim 1, wherein the self-expanded lignofoam is free of urethane bonds and free of covalent bonds between lignin and the thermoplastic polymer.

11. The method of claim 1, wherein the thermoplastic polymer is selected from polypropene (PP), poly(methyl methacrylate) (PMMA), acrylonitrile butadiene styrene (ABS), nylon, polybenzimidazole (PBI), polycarbonate (PC), polyether sulfone (PES), polyoxymethylene (POM), polyether ether ketone (PEEK), polyethylene terephthalate (PETE), polyetherimide (PEI), polyethylene (PE), polyphenylene oxide (PPO), polyphenylene sulfide (PPS), polystyrene (PS), polyvinyl chloride (PVC), teflon or polytetrafluoroethylene (PTFE), polyacrylonitrile (PAN), and combinations thereof.

12. The method of claim 11, wherein the thermoplastic polymer is polypropene.

13. A method of making a self-expanded lignofoam, the method comprising:
exposing a self-expanding lignofoam composition comprising raw lignin, at least partially decomposed lignin, and a thermoplastic polymer to an elevated temperature for a period of time to soften the composition, desorb water from the raw lignin or induce at least some hydroxyl groups of the raw lignin to undergo dehydration reactions to generate water or both, vaporize water, and generate pores throughout the softened composition,
wherein the self-expanding lignofoam composition has a lignin content of at least 50 wt % and the raw lignin has a moisture content of from 0 wt % to 15 wt %; the at least partially decomposed lignin is present at an amount of from 3 wt % to 20 wt %; the self-expanding lignofoam composition is free of an added plasticizer, an added lubricant, an added foaming agent, and an added blowing agent; and the thermoplastic polymer is not a starch, not a polyurethane, and not a polysiloxane; and
cooling the porous, softened composition to room temperature to provide the self-expanded lignofoam.

14. The method of claim 13, wherein the self-expanding lignofoam composition consists essentially of the raw lignin, the at least partially decomposed lignin, the thermoplastic polymer, and optionally, an inorganic oxide.

15. The method of claim 13, wherein the elevated temperature is from 150° C. to 300° C. and the period of time is from 5 min to 120 min.

16. The method of claim 15, wherein the elevated temperature is from 180° C. to 280° C. and the period of time is from 5 min to 60 min.

17. The method of claim 1, wherein the raw lignin has a moisture content in a range of from 0 wt % to 5 wt %.

18. The method of claim 17, wherein the thermoplastic polymer is present at an amount of not more than 30 wt %.

* * * * *